US006766253B2

(12) United States Patent
Burns et al.

(10) Patent No.: US 6,766,253 B2
(45) Date of Patent: Jul. 20, 2004

(54) METHOD FOR MERGING POSITION INFORMATION WITH MEASUREMENTS AND FILTERING TO OBTAIN HIGH-QUALITY IMAGES THAT ARE POSITIONED ACCURATELY WITH RESPECT TO GLOBAL COORDINATES

(75) Inventors: Macyln Burns, Danbury, CT (US); Anthony DeRubeis, Danbury, CT (US); Paul Albats, Jr., Ridgefield, CT (US); Robert Casadonte, Austin, TX (US); Ralf Birken, Boston, MA (US); Ross Deming, Winchester, MA (US); Jakob Haldorsen, Norwalk, CT (US); Thorkild Hansen, Brighton, MA (US); Douglas E. Miller, Sandy Hook, CT (US); Michael L. Oristaglio, Newtown, CT (US)

(73) Assignee: Witten Technologies Inc., Boston, MA (US)

( * ) Notice: Subject to any disclaimer, the term of this patent is extended or adjusted under 35 U.S.C. 154(b) by 100 days.

(21) Appl. No.: 10/097,713

(22) Filed: Mar. 13, 2002

(65) Prior Publication Data

US 2003/0135328 A1 Jul. 17, 2003

(Under 37 CFR 1.47)

Related U.S. Application Data

(60) Provisional application No. 60/275,887, filed on Mar. 14, 2001.

(51) Int. Cl.[7] ................................................ G01V 7/00
(52) U.S. Cl. ............................................................ 702/6
(58) Field of Search ............................... 702/5, 2, 150; 701/50, 23, 25, 26, 27, 208, 210, 213, 214, 215, 216

(56) References Cited

U.S. PATENT DOCUMENTS

| 5,629,626 A | 5/1997 | Russell et al. |
| 5,920,828 A | 7/1999 | Norris et al. |
| 5,987,383 A | * 11/1999 | Keller et al. ................ 701/213 |

(List continued on next page.)

OTHER PUBLICATIONS

Mercy, Leo; GPS Surveying at CPCC's Mojave Cement Plant "Real–Time Kinetic Surveying —Generating Real–Time Savings; " IEEE–IAS/PCA 43rd Cement Industry Technical Conference; Apr. 2001, pp. 411–419; Vancouver, B.C.

Lloret, Polen, Sagem, Paris, France; Intertial +Total Station +GPS for High Productivity Surveying; Position Location and Navigation Symposium, Mar. 1990; pp. 338–346; Las Vegas, NV.

(List continued on next page.)

*Primary Examiner*—Donald McElheny, Jr.
(74) *Attorney, Agent, or Firm*—Fulbright & Jaworski L.L.P.

(57) ABSTRACT

An apparatus and method for combining a survey measurement dataset and a position dataset into a single dataset containing both measurement and position data is disclosed. The survey measurement data may be obtained from a ground penetrating radar, an inductometer, a magnetometer, or an optical camera. Positioning information is collected and merged with the survey information so that the position of the survey tool is known at each data point. Also provided are channel-equalization filters, spiking deconvolution filters, and frame filters that can be used in conjunction with the positioning information to enhance the quality of the images obtained from the data collected by the survey tool.

34 Claims, 5 Drawing Sheets

U.S. PATENT DOCUMENTS

| | | | | |
|---|---|---|---|---|
| 6,008,756 | A | * 12/1999 | Boerhave et al. | 342/357.13 |
| 6,021,376 | A | * 2/2000 | Wilson | 702/5 |
| 6,026,135 | A | * 2/2000 | McFee et al. | 376/159 |
| 6,064,940 | A | * 5/2000 | Rodgers et al. | 701/207 |
| 6,078,285 | A | 6/2000 | Ito | |
| 6,084,510 | A | * 7/2000 | Lemelson et al. | 340/539.13 |
| 6,094,625 | A | * 7/2000 | Ralston | 702/150 |
| 6,141,614 | A | * 10/2000 | Janzen et al. | 701/50 |
| 6,199,000 | B1 | * 3/2001 | Keller et al. | 701/50 |
| 6,366,851 | B1 | * 4/2002 | Chojnacki et al. | 701/208 |
| 6,370,547 | B1 | 4/2002 | Eftink | |
| 6,430,510 | B1 | 8/2002 | Thomas et al. | |
| 6,445,983 | B1 | * 9/2002 | Dickson et al. | 701/23 |
| 6,577,906 | B1 | * 6/2003 | Hurtado et al. | 700/2 |

OTHER PUBLICATIONS

Reed, Morgan D., P.E., et al.; The Application of Air and Ground Based Laser Mapping Systems to Transmission Line Corridor Surveys; Position Location and Navigation Symposium, Apr. 1996, pp. 444–451; Lafayette, Louisiana.

Bernstein, Ralph, et al., Imaging Radar Maps Underground Objects in 3–D; IEEE Computer Applications in Power, Jul. 2000; pp. 21–24.

* cited by examiner

METHOD FOR MERGING POSITION INFORMATION WITH MEASUREMENTS AND FILTERING TO OBTAIN HIGH-QUALITY IMAGES THAT ARE POSITIONED ACCURATELY WITH RESPECT TO GLOBAL COORDINATES

RELATED APPLICATION

The present application claims priority from U.S. Provisional Patent Application No. 60/275,887 filed on Mar. 14, 2001.

FIELD OF THE INVENTION

This invention relates to an apparatus and method for combining a survey measurement dataset and a position dataset into a single dataset containing both measurement and position data.

SUMMARY OF THE INVENTION

A method and apparatus are described for (1) determining the position of a survey tool at each point in space where it collects data, and (2) combining measurements to create spatially coherent data sets that can be used to obtain high-quality images. The survey tool can be any number of instruments used for surveying such as, for example, a ground penetrating radar, an induction apparatus, a magnetometer, or an optical camera. A tracking tool monitors and records positions of the survey tool. The recorded positions are merged with the data collected by the survey tool, so that the position of the survey tool is known at each data-collection point. The position is given in a coordinate system that can be related to any fixed feature in the survey area (for example, street coordinates) or to global coordinates (for example, latitude-longitude-height or Universal Transverse Mercator coordinates). With the position of the survey tool known at each data point, one can accurately merge the data from several surveys to get a big data set for the combined survey area. The big data set can be processed to get better images of the subsurface than could be obtained from each single-survey data set alone. Moreover, when the data set is given in terms of street coordinates (or global coordinates), the images obtained from that data set will also be given in those coordinates. Hence, the image can be incorporated into Geographical Information Systems (GIS) and CAD maps available for some areas. Also provided are channel-equalization filters, spiking deconvolution filters, and frame filters that can be used in conjunction with the positioning information to enhance the quality of the images obtained from the data collected with the survey tool.

INTRODUCTION

A precise map of the subsurface is essential to avoid damaging existing utilities (water, gas, electric lines, etc.) during excavation. For example, prior to digging trenches to install new pipes, a construction crew must know where the existing pipes are buried to avoid damaging them. A lack of accurate maps of construction sites results each year in thousands of broken pipes and repair costs of billions of dollars.

Figure 1:
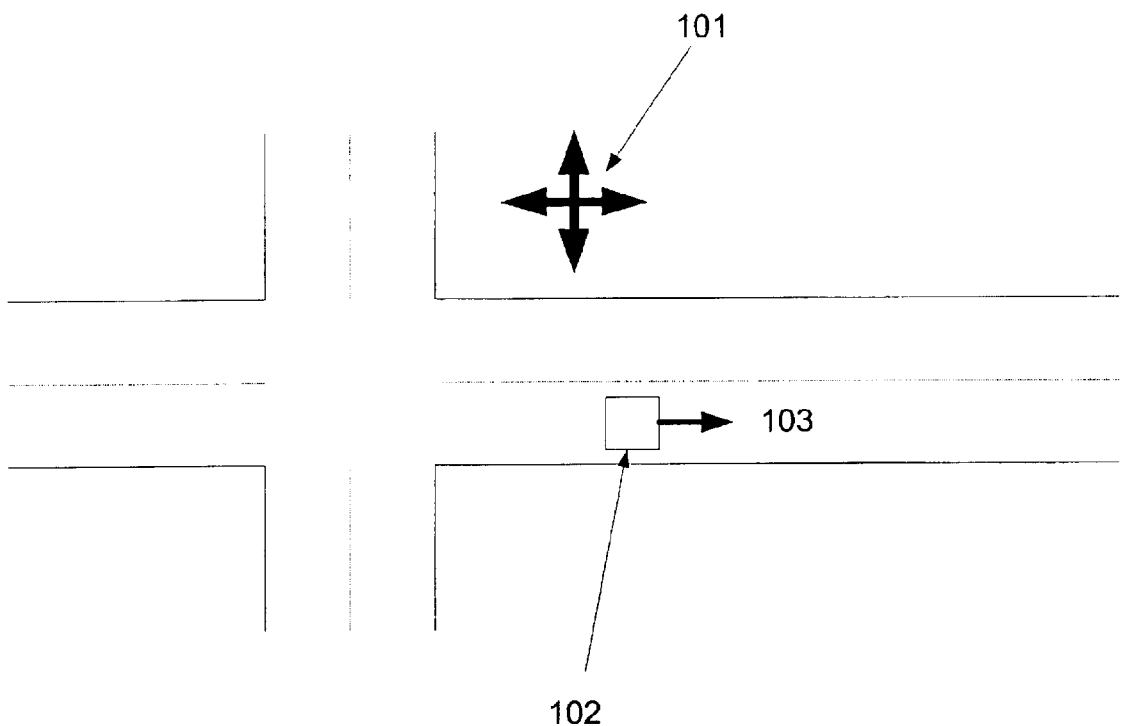
FIG. 1 illustrates a surface for which the present invention may be used.

Accurate maps can be created without excavation with the help of survey tools such as ground penetrating radar systems and magnetometers. For large surveys the survey tool is typically mounted on a vehicle and moved over the area of interest as shown in FIG. 1. Fixed station 101 defines a coordinate system. Survey tool 102, whose coordinates are known, moves down the road in direction 103 and records certain physical quantities (radar systems record electromagnetic waves and magnetometers record magnetic fields). To cover areas of reasonable size, the survey tool must often be moved across the area several times. For example, to cover one traffic lane in FIG. 1, survey tool 102 must at least make two passes down that lane. A full survey of an area therefore often consists of many smaller surveys.

Images of the subsurface are obtained by applying appropriate processing methods to the data collected by the survey tool. To obtain the best images of the subsurface, one should use the largest survey area possible. For example, to get the best map of the pipes under a traffic lane in FIG. 1, one should use the combined data set obtained from the two passes. Hence, it is important to be able to accurately stitch together the data obtained from each pass. To stitch passes together one must know the position of the survey tool at collected data points. Moreover, the survey tool must often travel along curved paths because of bending roads and obstacles in the road, and the merging of two passes becomes a difficult task, especially since centimeter accuracy is required for some survey tools (such as radar).

A map of the subsurface is useful only if it can be related to a known coordinate system. For example, a map of the subsurface of one of the lanes in FIG. 1 must be positioned correctly with respect to features in the street such as fire hydrants, curbs, and lampposts. Many existing street maps with utilities are available today in CAD or Geographical Information Systems (GIS) formats. However, an image obtained with a survey tool can only be inserted into an existing utility map if the coordinate system used for the image can be related to the coordinate system used in the utility map.

To survey large areas it is often advantageous to employ array survey tools that have many transmit-receive elements. For example, a sixteen-channel array radar would in principle be able to survey an area sixteen times faster than a single-channel radar. However, the channels of the array are not identical because of different relative positions of array elements within the array and differences in the hardware of each element. Consequently, the data collected with the array is not identical to the data collected with the single-channel system. Most processing methods that generate images of the subsurface assume implicitly that the data was collected with identical array elements. Hence, prior to processing the data it is advantageous to apply a channel-equalization filter to each channel to obtain an array data set that closely resembles the data set that would be obtained with array elements that are truly identical. Similarly, filters can compensate for variations in soil conditions and remove features that are nearly constant over certain subregions of the survey area.

In summary, knowing the position of the survey tool at each collected data point is critically important for merging surveys and for positioning the resulting images with respect to fixed street coordinates. The present invention provides an apparatus and a method for obtaining this position information by employing conventional tracking tools in conjunction with the survey tool. In addition, filters can be applied to the collected data to enhance the image equality.

Background Technology

An article by F. Lehmann and A. G. Green entitled "Semiautomated georadar data acquisition in three dimensions" (*Geophysics*, Vol. 64, May–June 1999, pp. 719–731) describes a system where the positioning of a ground penetrating radar is monitored with a self-tracking laser theodolite. The radar data and positioning data are continuously merged through a fiber-optic link between the positioning system and the PC that triggers the radar system. The article also mentions that the self-tracking laser theodolite can be used for induction surveys. A fiber-optic link may be problematic for street applications where traffic prevents the use of cables (alternatively, one could use a radio link).

There are a number of key differences between the method described in the Lehmann and Green article and the method of the present invention. For example, the Lehmann and Green article uses only a single transmitter and receiver and does not deal with array devices. Therefore that article does not explain how to merge array data sets corresponding to single passes to get a single big data set with no overlaps. Moreover, that article does not explain how the data can be re-gridded to get a regularly sampled data set.

Another key difference is that the Lehmann and Green article assumes that there is one position recording per radar data point. The method of the present invention describes an interpolation method that uses fewer position recordings than radar data points (i.e., it is not required to make a position recording each time a radar recording is made). A typical survey tool speed is 1–2 km/h and the required sampling distance is 10–20 cm, so the time between radar measurements is on the order of 0.1 second. To get accurate position information from self-tracking laser theodolites one typically can make only one reading per second. Hence, for typical street applications, one cannot reliably take one position recording at each radar recording.

Several articles describe how Global Positioning Systems (GPS) can be employed to monitor the position of radar and induction tools in large-scale surveys. (See, for example, R. E. Yoder, R. S. Freeland, J. T. Ammons, and L. L. Leonard, "Mapping agricultural fields with GPR and EMI to predict offsite movement of agrochemicals," *Proceedings of GPR 2000, Eighth International Conference on Ground Penetrating Radar*, Gold Coast, Queensland, Australia, May 23–26, 2000.) In its current state, GPS can achieve centimeter accuracy for moving targets. For example, the Leica MC500 is a 12-channel dual-frequency GPS receiver that uses real-time kinematic (RTK) techniques to provide ten independent position solutions per second with a latency of 50 milliseconds to an accuracy of one centimeter. However, GPS does not work in certain cities or in cloudy conditions where the signals sent out by the satellites do not reach the system on the ground.

The main purpose of the filters described below is to enhance the quality of the images obtained from data collected with the survey tool. Numerous articles and patents describe filtering methods. Of particular relevance to the present invention are the following references:

1. J. Haldorsen, D. Miller, and J. Walsh, "Multichannel Wiener Deconvolution of Vertical Seismic Profiles," *Geophysics*, Vol. 59, No. 10 (October 1994), pp. 1500–1511.

2. U.S. Pat. No. 4,922,362, "Methods for Deconvolution of Unknown Source Signatures From Unknown Waveform Data," D. Miller, J. Haldorsen, and C. Kostov, May 1, 1990.

3. U.S. Pat. No. 5,859,811, "Method of Analyzing Waveforms," D. Miller and F. Stanke, Jan. 12, 1999.

These references describe filters that are similar to the ones provided by the present invention. However, the filters of the present invention are constructed especially for ground penetrating radar array data and contain features not described in the aforementioned references. (For example, the channel-equalizing filter described below is not provided by the references listed above.) Moreover, this type of filtering has not previously been applied to data collected with survey tools such as a ground penetrating radar array. Further, this type of filtering has not heretofore been used in conjunction with the positioning techniques provided by the present invention.

DETAILED DESCRIPTION

Merging Position Information with Measurements

The system for merging position information with measurements consists of the following two main components.

(1) The survey tool is the apparatus that performs the measurements of the physical properties of the area that is surveyed. This tool is typically moved over the survey area on a trailer or directly attached to a vehicle. This tool may perform a number of measurements including, for example, (a) radar measurements where electromagnetic waves are used, (b) induction measurements where diffusive electromagnetic fields are used, (c) measurements of magnetic fields emitted by pipes on which currents have been injected, (d) measurements of the magnetic fields emitted by power lines, (e) measurement of the static magnetic field, and (f) photographic pictures recorded with videos, web cams, or other types of cameras.

(2) The tracking tool records the position of the survey tool with respect to a fixed local coordinate system. In one embodiment described below, this device consists of one ground station and one moving unit attached to the survey tool. Numerous tracking tools are commercially available. Some of these employ the Global Positioning System (GPS), which is a satellite-based locating and navigating utility that determines a user's precise latitude, longitude, and altitude by tracking signals from satellites. Other tracking tools use self-tracking laser theodolites that do not employ satellite positioning.

A number of companies provide tracking tools that may be used in accordance with the present invention. For example, such tools are provided by the following companies:

(1) Leica Geosystems.

(2) Trimble Navigation Ltd.

(3) Spectra Precision (recently acquired by Trimble).

(4) NovAtel Inc.

(5) Sokkia Co. Ltd.

(6) Applanix Corporation.

(7) Measurement Devices Ltd.

(8) Nedo.

An embodiment described below describes a setup with a self-tracking laser theodolite provided by Spectra Precision.

The tracking tools provided by these manufacturers can track the survey tool and determine its position with respect to fixed coordinates at a discrete number of "reflector positions," which may be acquired at non-uniform intervals. In order to make this positioning information useful, it must be merged with the recordings of the survey tool, so that the position of the survey tool is known at each data point, where data points and reflector positions do not generally coincide. Merging can be achieved by rigidly connecting the tracking tool to the survey tool, so that position information is continuously merged with the data stream of the survey tool. Alternatively, one can merge the positioning data with the measurements by attaching a survey wheel to the survey tool and proceeding as explained in the first example described below.

The result of performing the merging step, described above, is a set of multiple, curved, irregularly overlapping paths. Each path is populated by the coordinates of each array element of the survey tool at each point in which measurements were recorded. Sonic image processing methods require this irregularly sampled data to be re-interpolated onto a set of regular grids. A variation of the Matlab 'griddata' routine can be used to re-interpolate (or "re-grid") the data. (Matlab is a commercially available software package that may be obtained from The Mathworks, Inc.)

Once the positioning data is merged with the measurements and the data is re-gridded, one can employ processing methods appropriate for the various measurements to obtain images given in terms of the fixed coordinates associated with the tracking tool. These images can then be incorporated into CAD systems or Geographical Information Systems (GIS). (For CAD systems, see Bill Burchard and David Pitzer, *Inside AutoCAD* 2000, New Riders Publishing, 1999. For GIS, see Paul A. Longley (Editor), Michael F. Goodchild (Editor), and David J. Maguire, *Geographical Information Systems: Principles, Techniques, Applications and Management*, 2nd Edition, John Wiley & Sons, 1999; D. J. Maguire, M. F. Goodchild, and D. W. Rhind, *Geographical Information Systems*, Longman Scientific & Technical, 1991 (Chapter 42). These references describe the typical formats used to store information about street features such as curbs, pipes, manhole covers, etc.)

EXAMPLES

Figure 2:
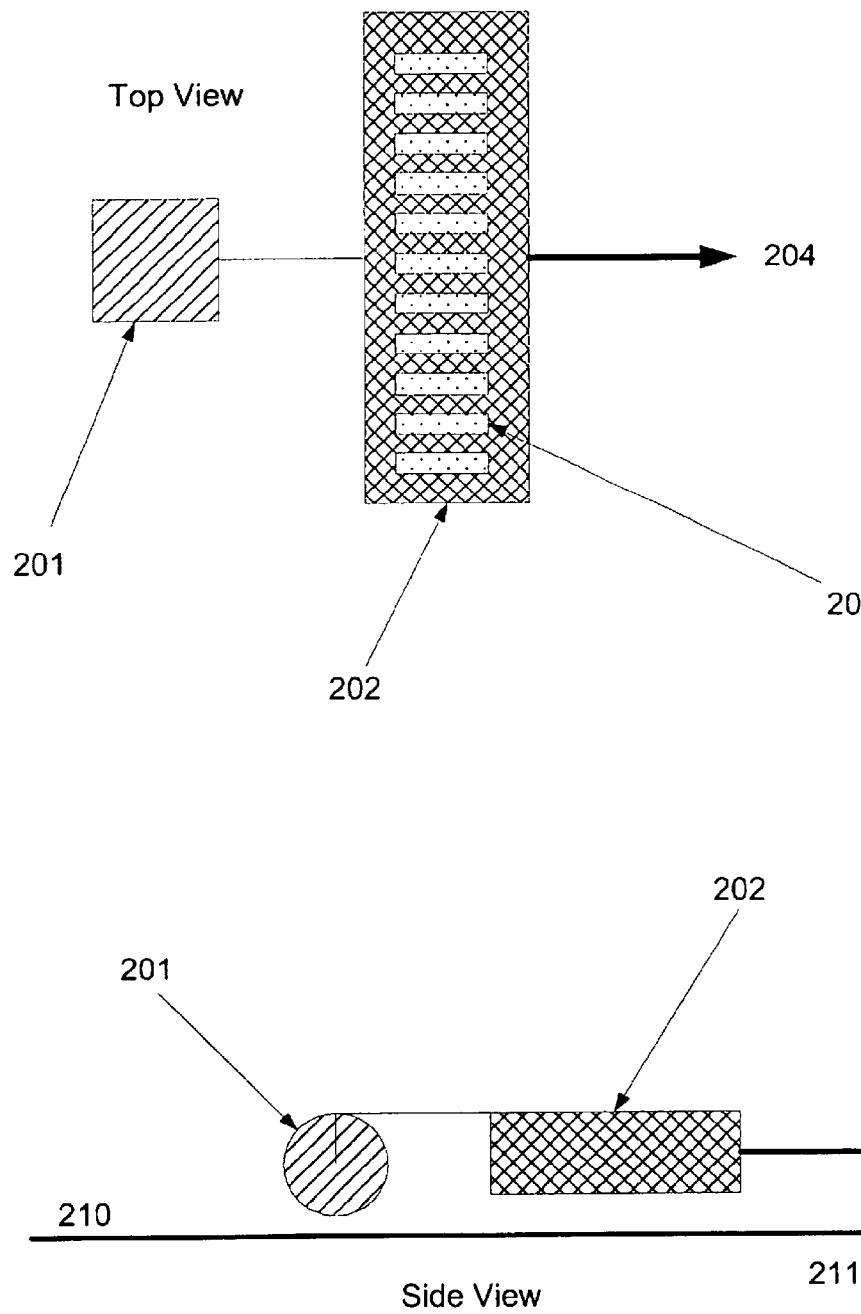
FIG. 2 illustrates a top view and a side view of an array of magnetometers and a survey wheel that may be used with the present invention.
Figure 3:
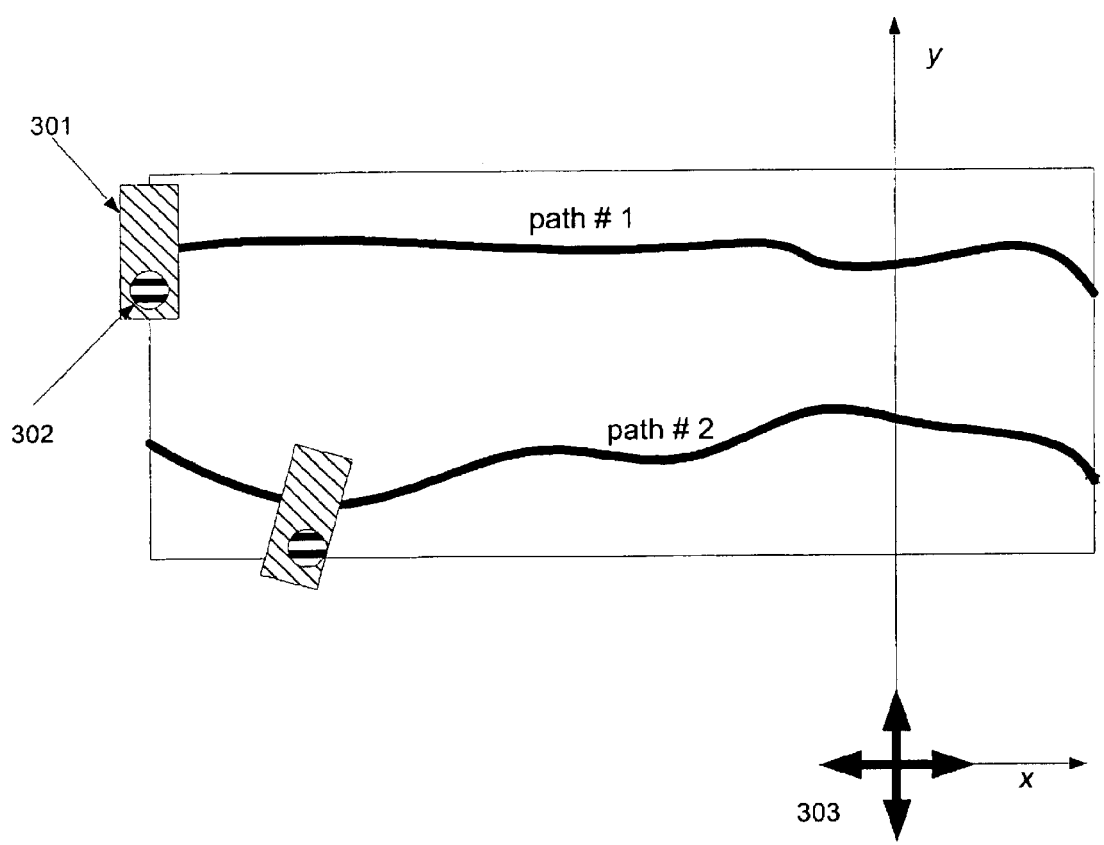
FIG. 3 illustrates a top view of a rectangular survey area with curved paths.

For a first example of the present invention, consider a survey tool that consists of an array of magnetometers mounted on a trailer that is towed by a vehicle. The magnetometers measure the magnetic field. A survey wheel attached to the survey tool tells the acquisition system when to record the output of the magnetometers. For example, one can set up the system so that the magnetic field at all magnetometers is measured a fixed number of times per revolution of the survey wheel. The magnetic field is thus measured at fixed intervals along the path of the survey tool. Survey tool 202 in FIG. 2 includes an array of magnetometers 203 and survey wheel 201 moving in direction 204 in air 210 while taking measurements in subsurface soil area 211. The entire survey can consist of one or more curved paths. For example, to record the magnetic field in the rectangular survey area of FIG. 3, survey tool 301 can be moved along the two curved paths (path #1 and path #2) also shown in FIG. 3. Fixed ground station 303 is used for geodimeter 302 and as the origin for the x-y-z coordinate system.

The Geodimeter System 600 Pro by Spectra Precision may be used for tracking. This system consists of a fixed ground station and a reflector, which is preferably mounted on the survey tool. A self-tracking laser theodolite on the ground station sends out a ray that hits the reflector and is sent back to the ground station. From the ray received at the ground station, the distance and the two angles between the ground station and the reflector may be determined. Based on this information, the rectangular coordinates of the reflector in the x-y-z coordinate system in FIG. 3 may be computed.

Figure 4:
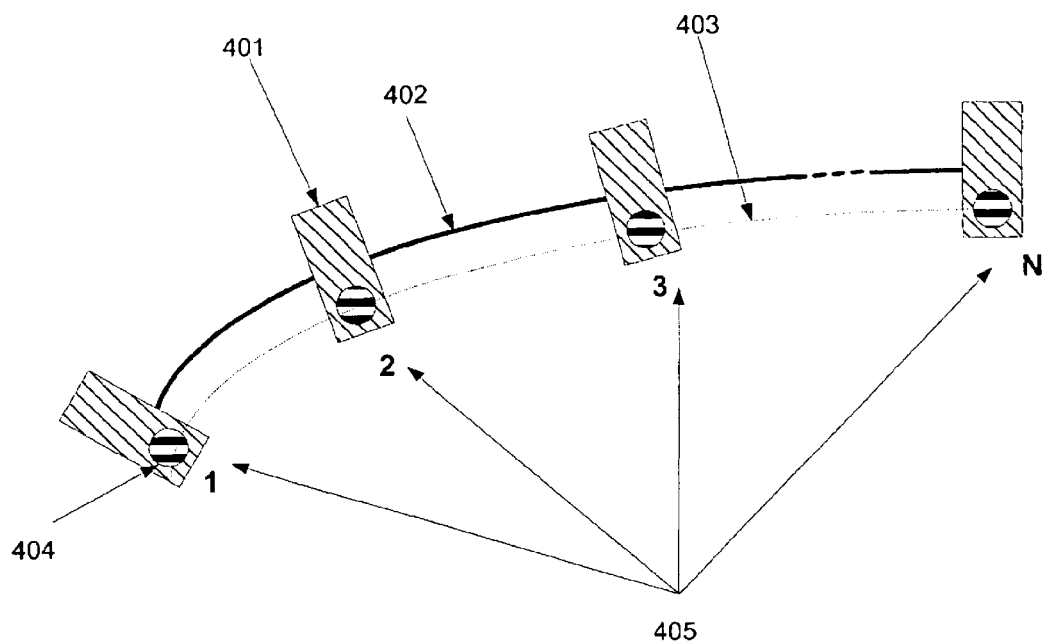
FIG. 4 is a survey path illustrating how position data may be merged with survey data.

In one mode of operation, the Geodimeter determines the (x,y,z) coordinates of the reflector at constant time intervals, regardless of the distance traveled by the survey tool. To explain how the magnetometer data is merged with the positioning data in this mode of operation, consider survey tool 401 with reflector 404 shown in FIG. 4. Here the survey extends from position #1 to position #N and one Geodimeter reading is recorded for each of these positions, thereby providing a total of N Geodimeter readings at N recorded reflector positions 405. Let M be the number of magnetometer readings (for each magnetometer) during the travel from position #1 to position #N, and assume that M is greater than N. Wheel 201 of survey tool 401 travels along path 402, and reflector 404 travels along path 403. The path segment traveled between each Geodimeter reading is approximated by a spline fit and the length of the spline segment is computed. The segment lengths are summed to obtain an apparent total length of the survey. The position of reflector 404 for each of the M magnetometer readings may now be determined by dividing the entire spline curve connecting position #1 to position #N into M pieces.

Now that the position of the reflector is known approximately for each of the M magnetometer readings, the (x,y) coordinates for each magnetometer at each reading may be determined. To do this, we simply assume that the survey tool is always perpendicular to the spline curve at the point the measurement was taken. Hence, at each magnetometer reading we know the (x,y) coordinates of the reflector as well as the orientation of the survey tool, so it is a simple matter to calculate the position of each magnetometer, and thus populate the set of curved paths with data coordinates. As described previously, the data can now be re-interpolated onto a set of rectangular grids ("re-gridded") prior to the final image-processing step.

For a second example, consider the previous example modified so that a time stamp is now inserted into the magnetometer data file each time a Geodimeter reading is recorded. Thus, we know the position of the reflector at certain points in the magnetometer data file. Consider the magnetometer data collected during the travel from one particular Geodimeter position to the next position in FIG. 4. (For example, consider the travel from position #2 to position #3.) Since we know which magnetometer readings were collected in this region, the reflector position at each of these magnetometer reading can be determined by interpolation solely from the two Geodimeter positions at the endpoints of the region. Hence, errors caused by survey-wheel slip and missed traces in one region do not affect the computed reflector positions in other regions.

For a third example, consider the previous two examples modified so that only a 2D line of data is collected during each pass. In this case the array of magnetometers consists of only one single magnetometer or, if the survey tool is a radar system, it consists of only one transmitter and one receiver.

Filtering

Radar data collected by an array of physical devices is subject to undesirable variations due to non-uniformity of the sensors. These variations can be removed or reduced by the application of appropriate digital filters designed to equalize the sensor response functions prior to the merging of the data. These filters may be obtained either by deterministic or data-adaptive methods or by some combination of both.

Deterministic filters are obtained by selecting from a bank of pre-determined filters designed to equalize responses under varying environmental conditions such as operating temperature and sensor elevation above the ground surface. In order to select the appropriate filter, auxiliary measurements of the environmental conditions are recorded simultaneously with the radar data.

Data-adaptive filters are obtained from the recorded radar data itself by solving systems of equations that model the data variability as resulting from a combination of systematic and random fluctuations. By suitably restricting the form of the model and the set of data used in the design, the systematic variations may account for the sensor variability to be removed.

Several types of data-adaptive filters are appropriate for preprocessing ground penetrating radar array (GPRA) data before merging. They can be used singly or in combination. (Examples are listed below.) GPRA data is indexed by time, channel, frame, and profile indices. For the purposes of the present discussion, a frame contains the time responses from all channels for one position of the radar array, and a profile is a collection of frames that covers a certain subregion of the survey area.

In a typical GPRA data set to be merged there may be approximately 256 time indices, 16 channel indices, about 5 to 50 profile indices, and about 200 to 2000 frame indices per profile. Each channel corresponds to a physical transmitter/receiver pair. Each frame corresponds to a physical position of the array on the surface. Each profile may correspond to a resetting of some environmental factor, such as the elevation of the array above the surface. After a (one-dimensional) Fourier-transform, the time indices are converted to an equal number of frequency indices. The Fourier transformed data may be denoted by $f_{data}(i_w,i_c,i_f,i_p)$ where $i_w$ indicates the frequency, $i_c$ indicates the channel, $i_f$ indicates the frame, and $i_p$ indicates the profile.

A spiking deconvolution filter may be used to compensate for per-profile variability (due, for example, to elevation changes). To implement this filter, for each profile p and each frequency w solve the vector equation $$F * f_{data}(i_w,:,i_{use},i_p) = \text{ones}(n_{chan}*n_{use},1)$$

for the complex scalar $F=F(i_w,i_p)$ that minimizes the RMS error. (Here, $n_{chan}$ is the number of channels, $i_{use}$ is the list of useable frames, and $n_{use}$ is the number of usable frames. Moreover, ones(m,1) is a 1 dimensional vector of length m with all its elements equal to one.) This filter combines across channels, but not across profiles. The filtered data is simply $F(i_w,i_p)*f_{data}(i_w,i_c,i_f,i_p)$.

A channel-equalization filter (match-filter) may be used to compensate for per-channel variability. For each frame in the design set, this filter is modeled by a spiking-deconvolution filter, again filtered so that all channels should have the same response. To implement this filter, choose a reference channel $c_r$. For each channel c and each frequency w, solve the vector equation $$F * f_{data}(i_w,i_c,i_{use},:) = f_{data}(i_w,i_{c_r},i_{use},:)$$

for the complex scalar $F=F(i_w,i_c)$ that minimizes the RMS error. Here, $i_{use}$ is a list of useable frames (i.e., those that do not have strongly scattering surface features, such as manhole covers) and the last free index runs over all profiles that are being grouped together. The filtered data, which is subsequently used for computing the image, is simply $F(i_w,i_c)*f_{data}(i_w,i_c,i_f,i_p)$.

An alternative approach to manually select the set of traces ($i_{use}$) to use for designing the filter F involves the use of a robust per-antenna estimate obtained by using median estimators when inverting the above equation. This approach is described in a paper by J. Haldorsen, D. Miller, and J. Walsh entitled "Multichannel Wiener Deconvolution of Vertical Seismic Profiles" (*Geophysics*, Vol. 59, No. 10 (October 1994), pp. 1500–1511). Also, instead of using a specific antenna ($i_{c_r}$) for the design-waveform ($f_{data}(i_w,i_c,i_f,i_p)$), one may for a robust filter use the median of all waveforms, or any other desired waveform.

A frame-filter may be used to remove all features that are nearly constant from frame to frame. It may be modeled by assuming that anything that does not change from frame to frame is system noise. To implement this filter, for each profile p, time t, and channel c, apply a high-pass filter (with respect to the frame index) to the time-domain data array $g_{data}(i_t,i_c,:,i_p)$. Alternatively, one may subtract the median of each profile.

Figure 5:
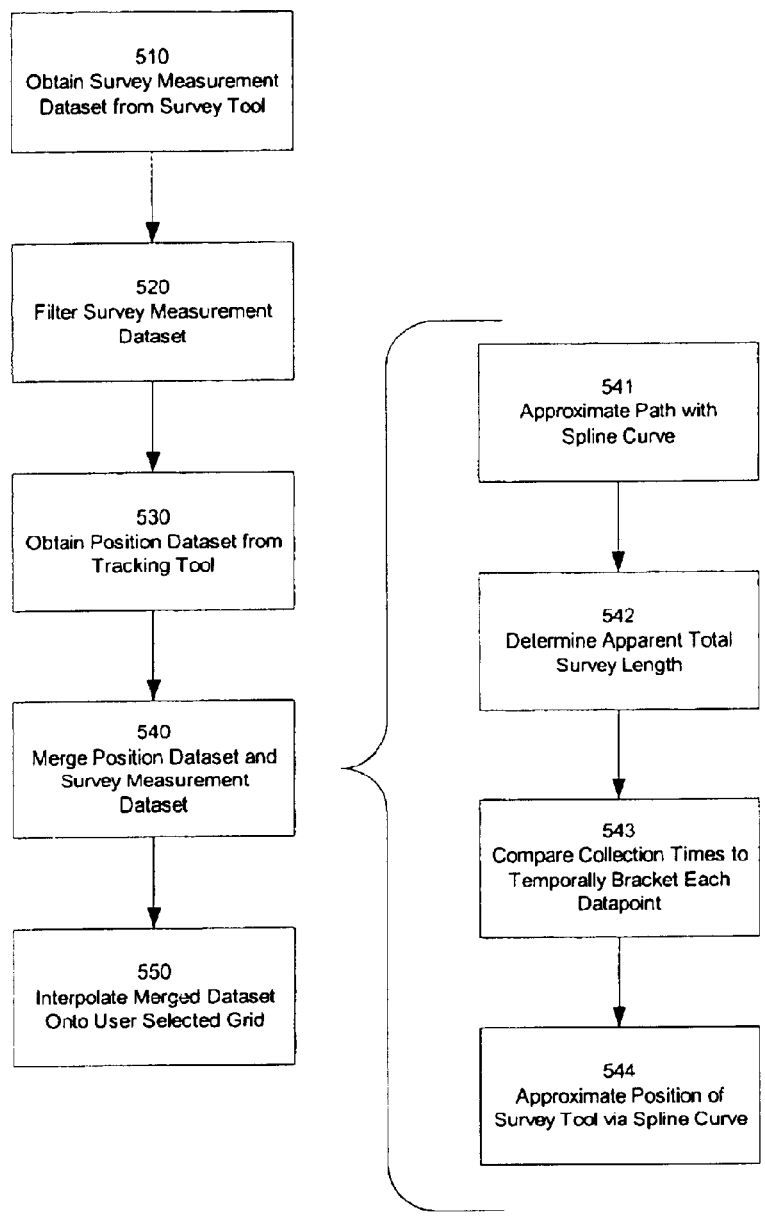
FIG. 5 is a flow chart illustrating an embodiment of the present invention.

An embodiment of the present invention is illustrated as a flow chart by FIG. 5. The step of obtaining a survey measurement dataset from a survey tool occurs in step 510. The step of filtering the survey measurement dataset occurs in step 520. The step of obtaining a position dataset from a tracking tool occurs in step 530. The step of merging the position dataset and the survey measurement dataset occurs in step 540. The step of interpolating a merged dataset onto a user selected grid occurs in step 550.

Step 540 further contains the following steps: The step of approximating the survey path with a spline curve occurs in step 541. The step of determining an apparent total survey length occurs in step 542. The step of comparing collection times to temporally bracket each datapoint occurs in step 543. The step of approximating the position of a survey tool via the spline curve occurs in step 544.

CONCLUSION

The present invention, therefore, is well adapted to carry out the objects and obtain the ends and advantages mentioned above, as well as others inherent herein. All presently preferred embodiments of the invention have been given for the purposes of disclosure. Where in the foregoing description reference has been made to elements having known equivalents, then such equivalents are included as if they were individually set forth. Although the invention has been described by way of example and with reference to particular embodiments, it is not intended that this invention be limited to those particular examples and embodiments. It is to be understood that numerous modifications and/or improvements in detail of construction may be made that will readily suggest themselves to those skilled in the art and that are encompassed within the spirit of the invention and the scope of the appended claims.

We claim:

1. A method for merging a position dataset with a survey measurement dataset, comprising:

providing a movable survey tool;

providing a tracking tool adapted to provide the position of said survey tool with respect to a fixed local coordinate system;

obtaining a survey measurement dataset from said movable survey tool;

obtaining a position dataset from said tracking tool;

merging said position dataset with said survey measurement dataset to form a single merged sample dataset containing both measurement and position data; and, interpolating said merged sample data set onto a user selected set of grid points.

2. The method of claim 1, wherein said movable survey tool comprises a magnetometer.

3. The method of claim 1, wherein said movable survey tool comprises an array of magnetometers.

4. The method of claim 1, wherein said movable survey tool comprises a single-channel radar system.

5. The method of claim 1, wherein said movable survey tool comprises an array of radar antennas.

6. The method of claim 1, wherein said movable survey tool comprises a single-channel electromagnetic induction tool.

7. The method of claim 1, wherein said movable survey tool comprises an electromagnetic array induction tool.

8. The method of claim 1, wherein said movable survey tool comprises an optical camera.

9. The method of claim 1, wherein said movable survey tool comprises an array of optical cameras.

10. The method of claim 1, wherein said set of grid points is a regular grid.

11. The method of claim 1, further comprising the step of rigidly connecting said tracking tool to said movable survey tool.

12. The method of claim 1, further comprising the step of attaching a survey wheel to said movable survey tool.

13. The method of claim 1, wherein said step of obtaining a position dataset comprises the steps of:

providing a constant time period; and, determining position points of said survey tool at instances of time separated by said constant time period beginning with a first position point and ending with a final position point.

14. The method of claim 13, wherein said merging step comprises the steps of:

approximating the path of said survey tool with a spline curve;

determining an apparent total survey length by determining the length of said spline curve;

approximating the position of said survey tool at each of said position points by dividing said spline curve into a number of segments equal to the number of data points in said survey measurement dataset; and, approximating the position of said survey tool at each data point in said survey measurement dataset by assuming that said survey tool was perpendicular to said spline curve at each data point in said survey measurement dataset.

15. The method of claim 13, wherein said step of obtaining a survey measurement dataset further comprises the step of recording the time at which each data point in said survey measurement dataset is collected and wherein said step of obtaining a position dataset further comprises the step of recording the time at which each said position point is collected.

16. The method of claim 15, wherein said merging step comprises the steps of:

approximating the path of said survey tool with a spline curve;

determining the collection time for each data point in said survey measurement dataset and the collection time for each position point in said position dataset;

comparing the collection times for each data point with the collection time for each position point to temporally bracket each data point by a pair of adjacent position points, thereby associating each data point with a bracketed segment of said spline curve; and, approximating the position of said survey tool at each data point in said survey measurement dataset by assuming that said survey tool was perpendicular to its associated bracketed segment of said spline curve at each data point in said survey measurement dataset.

17. The method of claim 1, wherein said survey tool comprises an array of sensors each having a different sensor response function.

18. The method of claim 17, further comprising the step of filtering said measurement dataset prior to said merging step to equalize said sensor response functions.

19. The method of claim 18, wherein said filtering step comprises filtering via a deterministic filter.

20. The method of claim 18, wherein said filtering step comprises filtering via a data-adaptive filter.

21. The method of claim 20, wherein said data-adaptive filter is a spiking deconvolution filter.

22. The method of claim 20, wherein said data-adaptive filter is a channel-equalization filter.

23. The method of claim 20, wherein said data-adaptive filter is a frame filter.

24. An apparatus for providing a survey dataset containing merged measurement and position information, comprising:

a movable survey tool capable of providing measurement information;

a tracking tool capable of providing position information corresponding to said measurement information from said movable survey tool;

a computer programmed to merge said measurement information and said position information into a single merged sample dataset and to interpolate said mewed sample data set onto a user selected set of grid points.

25. The apparatus of claim 24, wherein said movable survey tool comprises a magnetometer.

26. The apparatus of claim 24, wherein said movable survey tool comprises an array of magnetometers.

27. The apparatus of claim 24, wherein said movable survey tool comprises a single-channel radar system.

28. The apparatus of claim 24, wherein said movable survey tool comprises an array of radar antennas.

29. The apparatus of claim 24, wherein said movable survey tool comprises a single-channel electromagnetic induction tool.

30. The apparatus of claim 24, wherein said movable survey tool comprises an electromagnetic array induction tool.

31. The apparatus of claim 24, wherein said movable survey tool comprises an optical camera.

32. The apparatus of claim 24, wherein said movable survey tool comprises an array of optical cameras.

33. The apparatus of claim 26, claim 28, claim 30, or claim 32, wherein said array is mounted on a trailer.

34. The apparatus of claim 24, wherein said tracking tool comprises a self-tracking laser theodolite.

* * * * *